United States Patent
Meqqadmi et al.

(10) Patent No.: US 11,002,624 B2
(45) Date of Patent: May 11, 2021

(54) METHOD AND DEVICE FOR MEASURING A THRUST MARGIN OF A TURBOMACHINE

(71) Applicant: Safran Aircraft Engines, Paris (FR)

(72) Inventors: Mohammed Meqqadmi, Moissy-Cramayel (FR); Jerome Henri Noel Lacaille, Moissy-Cramayel (FR); Pierre Etienne Mosser, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 372 days.

(21) Appl. No.: 16/124,539

(22) Filed: Sep. 7, 2018

(65) Prior Publication Data

US 2019/0072444 A1 Mar. 7, 2019

(30) Foreign Application Priority Data

Sep. 7, 2017 (FR) ...................................... 1758238

(51) Int. Cl.
  *G01L 5/13* (2006.01)
  *G01M 15/14* (2006.01)
  *G06F 30/20* (2020.01)
  *G06F 111/10* (2020.01)

(52) U.S. Cl.
  CPC .............. *G01L 5/133* (2013.01); *G01M 15/14* (2013.01); *G06F 30/20* (2020.01); *G06F 2111/10* (2020.01)

(58) Field of Classification Search
  CPC ..... G01L 5/133; G01M 15/14; G01M 5/0075; G06F 30/20; G06F 2111/10
  See application file for complete search history.

(56) References Cited

U.S. PATENT DOCUMENTS

| 4,537,066 A | * | 8/1985 | Simpson | G01L 5/133 |
| | | | | 73/112.03 |
| 5,170,662 A | * | 12/1992 | Brault | G01L 5/133 |
| | | | | 73/112.04 |
| 2015/0160100 A1 | * | 6/2015 | Maalioune | G01M 5/0075 |
| | | | | 73/118.01 |

(Continued)

FOREIGN PATENT DOCUMENTS

| EP | 1 327 750 A2 | 7/2003 |
| FR | 1 416 112 | 10/1965 |

(Continued)

*Primary Examiner* — Regis J Betsch
*Assistant Examiner* — Kaleria Knox
(74) *Attorney, Agent, or Firm* — Oblon, McClelland, Maier & Neustadt, L.L.P.

(57) ABSTRACT

A method for measuring a thrust margin of a turbomachine, in which data are acquired including the thrust margin which is determined as a function of a specified thrust and a measured thrust, the measured thrust being determined on a measuring bench which includes a bench equipment and on which the turbomachine is, wherein a time evolution of the thrust margin is modelled by at least one linear or affine function which is calculated for at least one determined time interval of the thrust margin, at least one bias of the bench equipment is calculated relative to at least one linear or affine function having been calculated, the thrust margin is corrected by subtracting from it at least one bias of the bench equipment in at least one determined time interval.

11 Claims, 10 Drawing Sheets

(56) References Cited

U.S. PATENT DOCUMENTS

Figure 1:
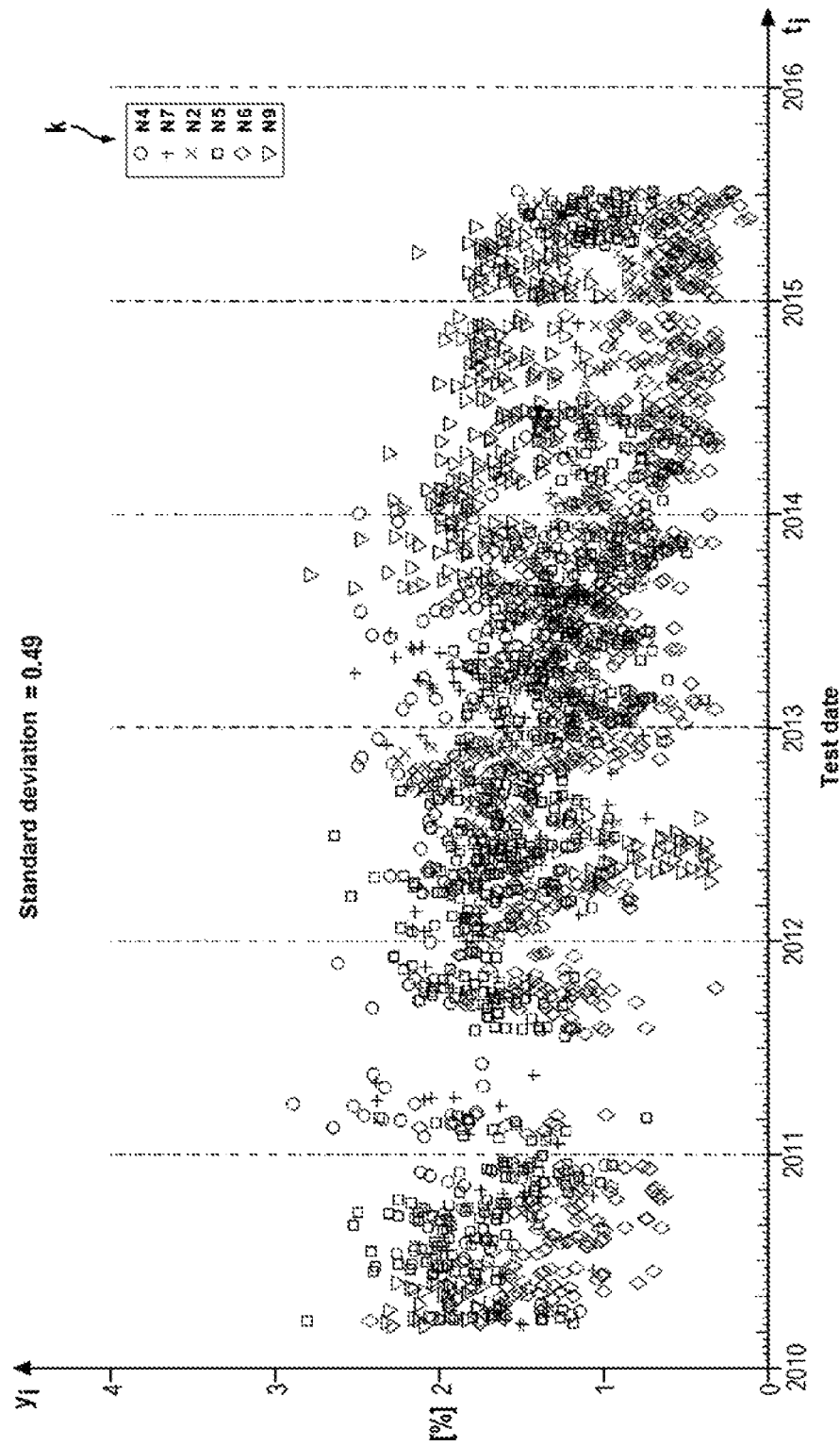

2016/0202131 A1\* 7/2016 Roy ................ G01L 1/086
                                                                                                                                                       73/650
2016/0281642 A1\* 9/2016 Le Gonidec .......... G01M 15/14

FOREIGN PATENT DOCUMENTS

| FR | 2 535 847 A1 | 5/1984 |
| FR | 3 012 930 A1 | 5/2015 |

\* cited by examiner

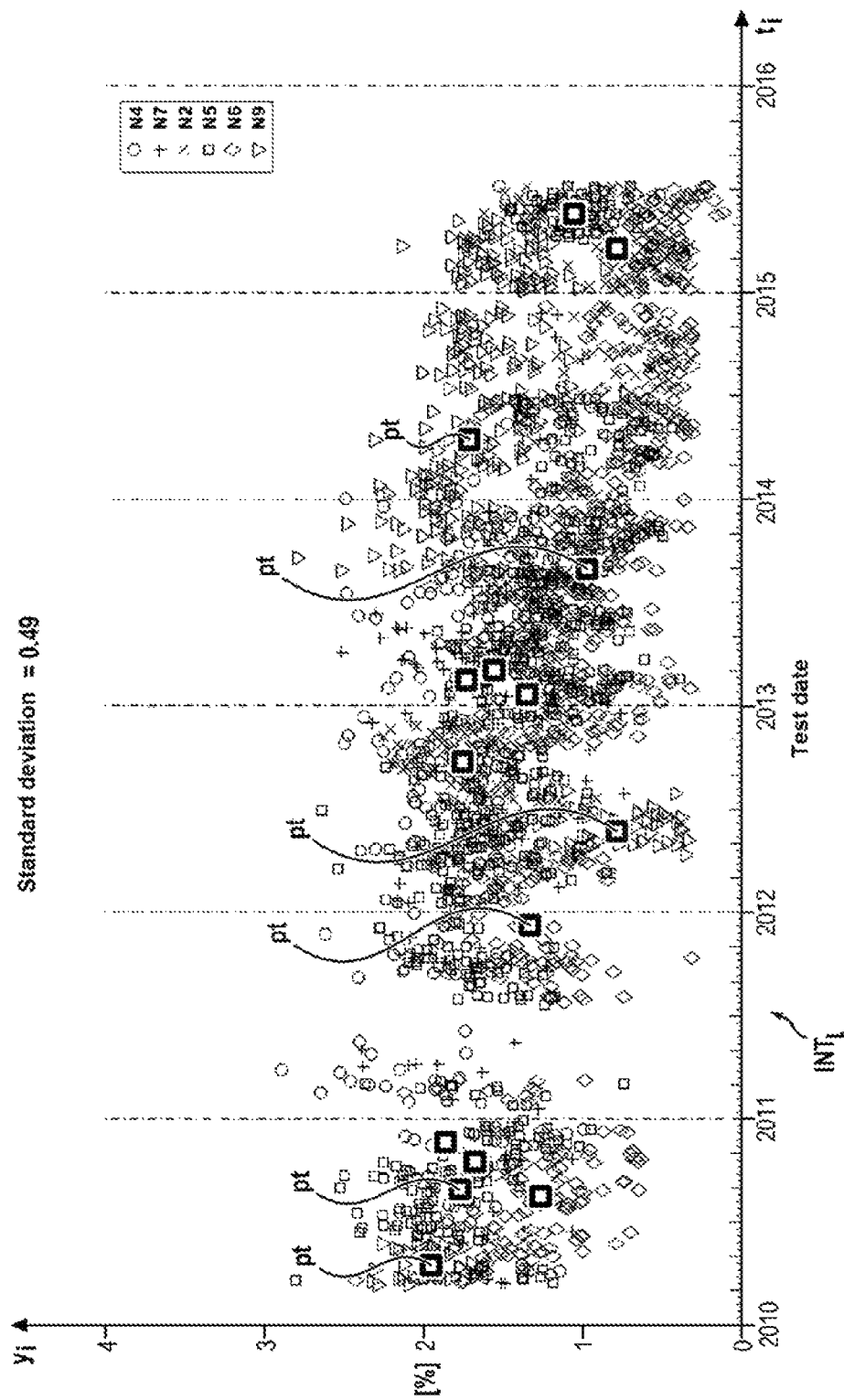

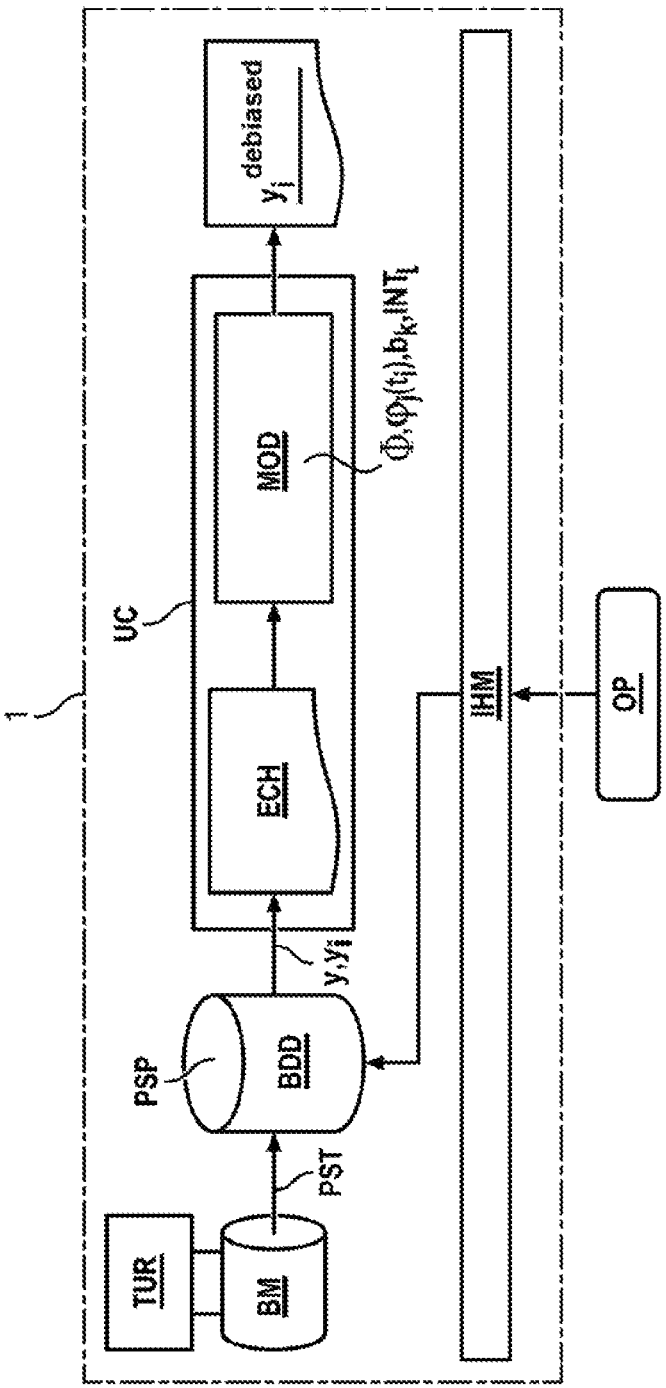

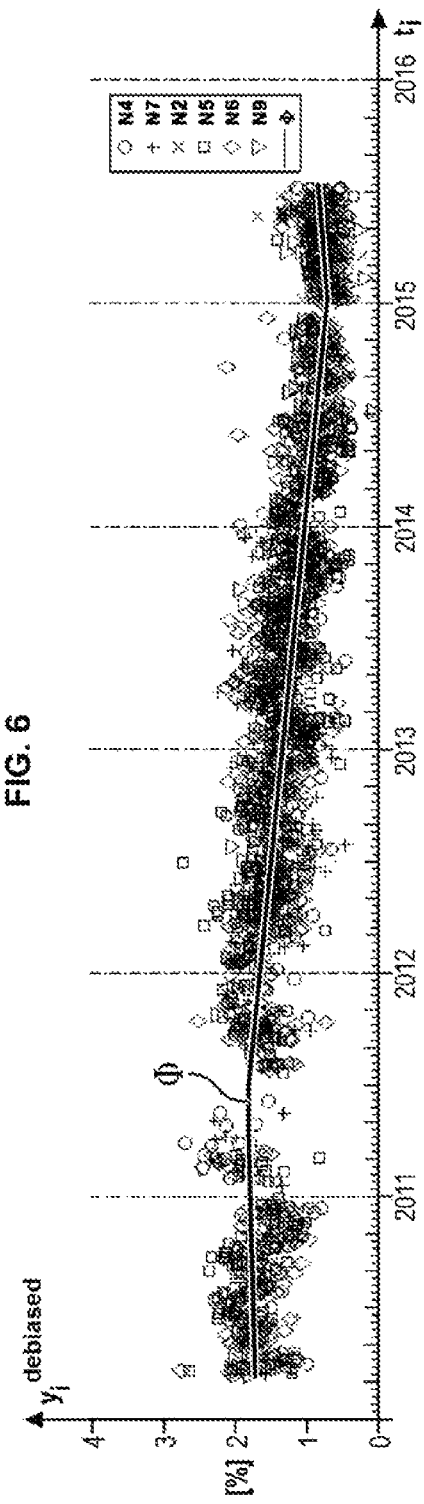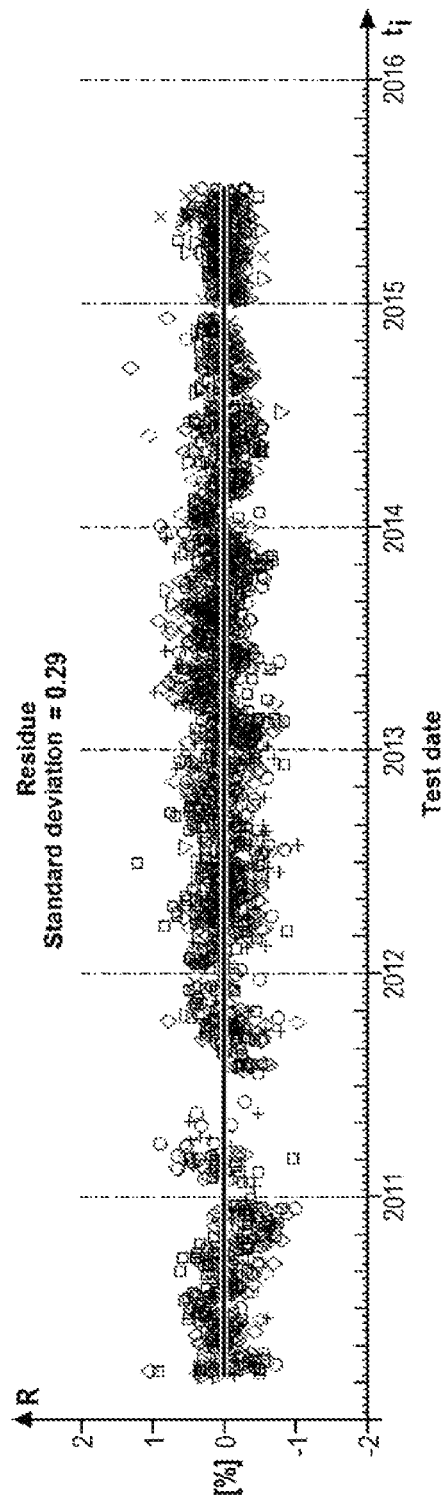

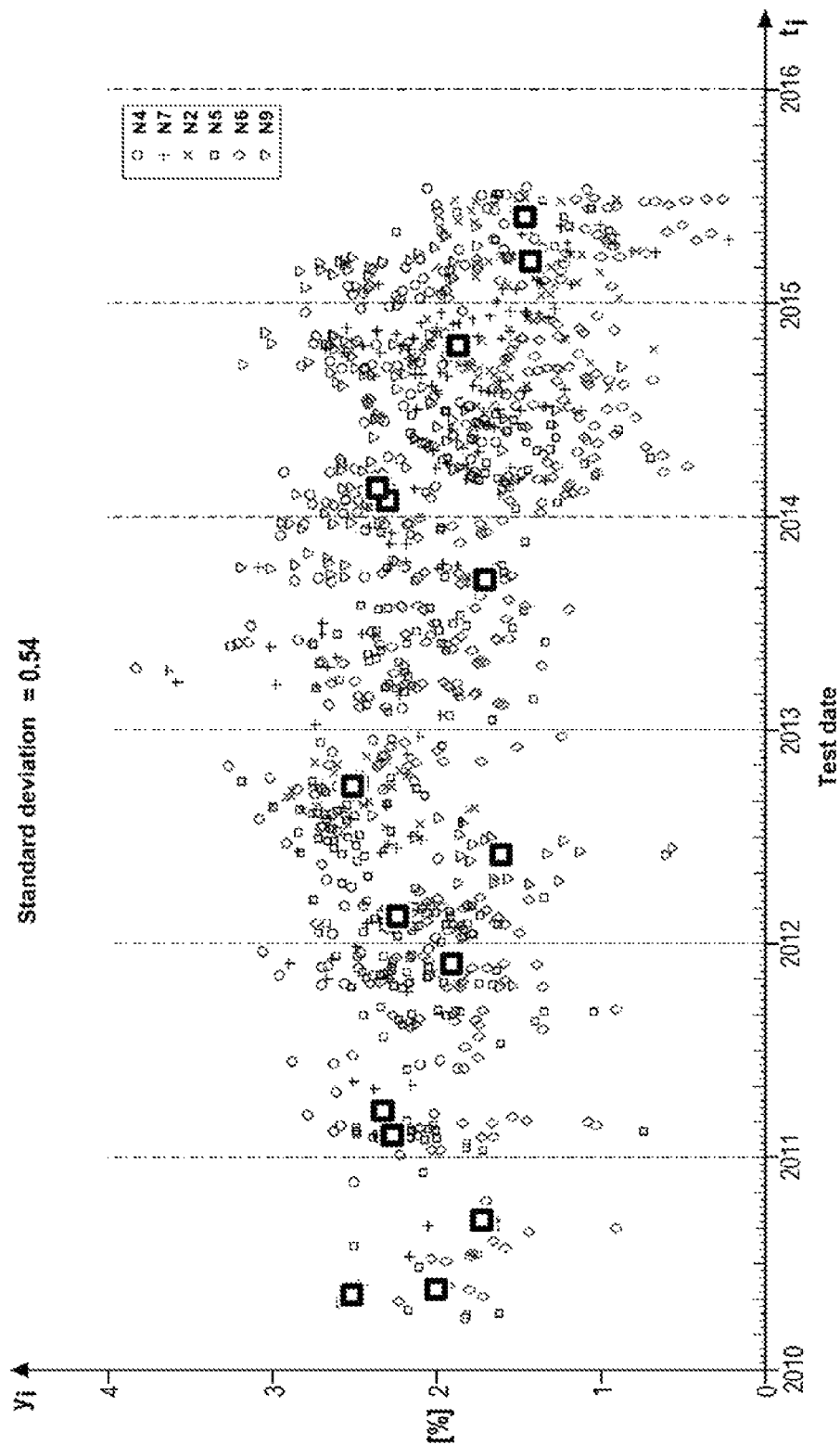

METHOD AND DEVICE FOR MEASURING A THRUST MARGIN OF A TURBOMACHINE

The invention relates to a method and device for measuring a thrust margin of a turbomachine.

A field of application of the invention is aircraft turbomachines, such as for example aircraft turbojets or aircraft turboprops.

The main characteristic of a turbomachine is its thrust.

It is therefore fundamental to measure its thrust precisely.

In the prior art, calibrating bench accessories is done in very distant periods and is usually declared done with precision of +/−0.25% in terms of thrust margin.

The document FR-A-1 416 112 describes a device for calibrating a thrust measuring bench of a rocket engine.

The document FR-A-2 535 847 describes a test cell for aircraft engines, providing aerodynamic correction of the measured thrust.

The document US-A-201610 202 131 describes the mechanical structure of a thrust-measuring sensor.

The inventors noticed that reception tests for verification of the functions of the turbomachine are conducted on different test benches, which impacts thrust measurements. A certification process imposes calculation of a thrust margin from the measured thrust.

It was determined that there was dispersion of the thrust margin due to test conditions. Dispersion of the thrust margin results from the complexity of the test conditions such as: CTA (Complementary technical adaptations), benches and sites. Therefore, it has been noted that measuring the thrust margin is influenced particularly by some large components such as the secondary nacelle and the bench. Also, measuring the thrust margin can be influenced by the fact that the different parts of the turbomachine come from different providers.

The invention aims to provide a measuring method and device for taking thrust measurements from different test benches with different equipments and to ensure that these measurements are comparable.

For this purpose, a first subject matter of the invention is a method for measuring a thrust margin of a turbomachine, in which data are acquired comprising the thrust margin which is determined as a function of a specified thrust and a measured thrust, the measured thrust being determined on a measuring bench, which comprises at least one bench equipment and which contains the turbomachine, characterized in that a time evolution of the thrust margin is modelled by at least one linear or affine function, which is calculated for at least one determined time interval of the thrust margin, at least one bias of the bench equipment is calculated relative to the at least one linear or affine function having been calculated, the thrust margin is corrected by subtracting from it the at least one bias of the bench equipment in the at least one determined time interval.

Thanks to the invention, the thrust margin is made independent of the test conditions and its dispersion is reduced. The invention allows better control of the production by reducing the uncertainty on the measurement of the thrust. Also, the invention identifies the production efficacy trends of each provider, which alerts the provider whenever the produced thrust of the turbomachine decreases and approaches the limit margin.

According to an embodiment of the invention, the linear or affine function is calculated in approaching a prescribed point or passing through a prescribed point, the prescribed point having been calculated as a function of the thrust margin on the determined time interval.

According to an embodiment of the invention, the prescribed point is calculated as being an average point of the thrust margin and in the middle of the determined time interval.

According to an embodiment of the invention, the midpoint of the thrust margin is calculated as being in the middle of the thrust margin and in the middle of the determined time interval.

According to an embodiment of the invention, the prescribed point has a determined time value in the at least one time interval and a thrust margin value, the linear or affine function is calculated as minimizing, on the at least one time interval, the difference between the thrust margin and the linear or affine function, relative to the difference between the thrust margin value of the prescribed point and the value of the linear or affine function taken at the determined time value of the prescribed point.

According to an embodiment of the invention, the linear or affine function $\varphi_j(t_i)$ is calculated as minimizing, on the at least one time interval, the following expression:

$$E = \sum_{l,i} [(y_i - pt_{Moy}) - (\varphi_j(t_i) - \varphi_j(t_{ptMoy}))]^2 \cdot \tau_l(i)$$

where $y_i$ is the thrust margin, $\tau_l(i)$ is a binary function indicative of each time interval (INTO, $t_{ptMoy}$ is the determined time value of the prescribed point in the at least one time interval, $pt_{Moy}$ is the thrust margin value of the prescribed point in the at least one time interval.

According to an embodiment of the invention, the at least one bias is calculated as minimizing, on the at least one time interval, the thrust margin from which the bias and the linear or affine function are subtracted, which is calculated at the measuring instant or measuring day corresponding to the thrust margin.

According to an embodiment of the invention, the at least one bias $b_k$ is calculated as minimizing, on the at least one time interval, the following expression:

$$\sum_i \left[ y_i - \varphi_j(t_i) - \sum_k b_k \cdot \delta_k(i) \right]^2$$

where $y_i$ is the thrust margin, $\delta_k(i)$ is a binary function indicative of the at least one item of equipment k of the measuring bench, $\varphi_j(t_i)$ is the linear or affine function.

According to an embodiment of the invention, the function $\gamma_j(t_i)$ indicative of the origin of data from the data source j or from the provider j of the at least one bench equipment k is considered, and the bias or the biases $b_k$ is calculated as minimizing, on the at least one time interval, the following expression:

$$\sum_{i,j} \gamma_j(i) \cdot \left[ y_i - \varphi_j(t_i) - \sum_k b_k \cdot \delta_k(i) \right]^2$$

where $y_i$ is the thrust margin, $\delta_k(i)$ is a binary function indicative of the at least one bench equipment k, $\varphi_j(t_i)$ is the linear or affine function, $\gamma_j(t_i)$ is the function indicative of the origin of data from the data source j or from the provider j of the at least one bench equipment k.

According to an embodiment of the invention, the at least one time interval corresponds to at least one production time interval and/or to at least one time interval, during which the at least one bench equipment is present on the measuring bench, and/or to the intersection between the at least one production time interval and the at least one time interval, during which the at least one bench equipment is present on the measuring bench.

A second subject matter of the invention is a device for measuring a thrust margin of a turbomachine, the device comprising a measuring bench, which comprises at least one bench equipment and on which the turbomachine is intended to be mounted, the measuring bench comprising means to acquire data comprising the thrust margin of the turbomachine, characterized in that the device also comprises an automatic calculation unit configured to model a time evolution of the thrust margin by at least one linear or affine function, which is calculated for at least one determined time interval of the thrust margin, calculate at least one bias of the bench equipment relative to the at least one linear or affine function having been calculated, correct the thrust margin by subtracting from it the at least one bias of the bench equipment in the at least one determined time interval.

Figure 2:
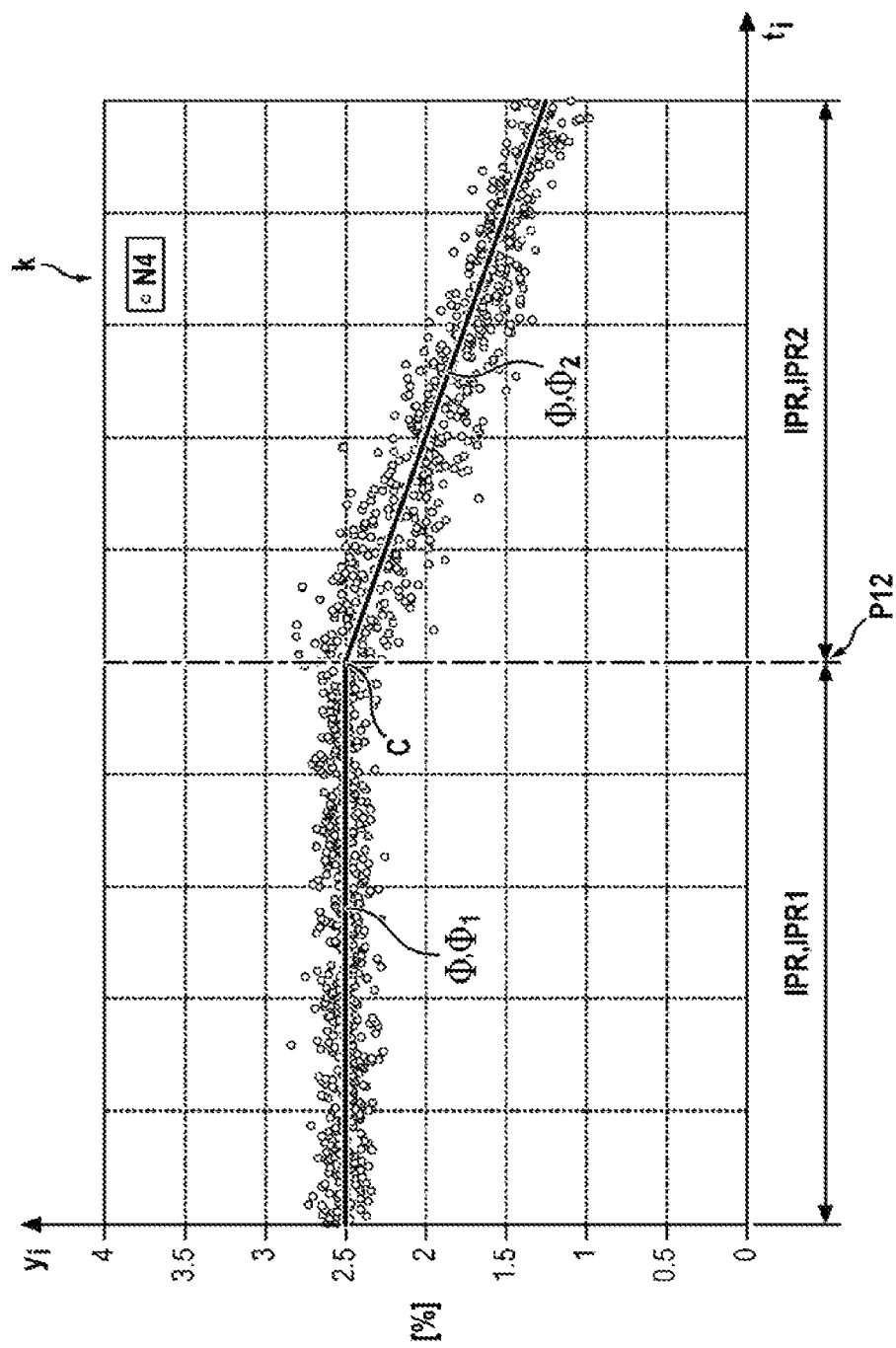
Figure 3:
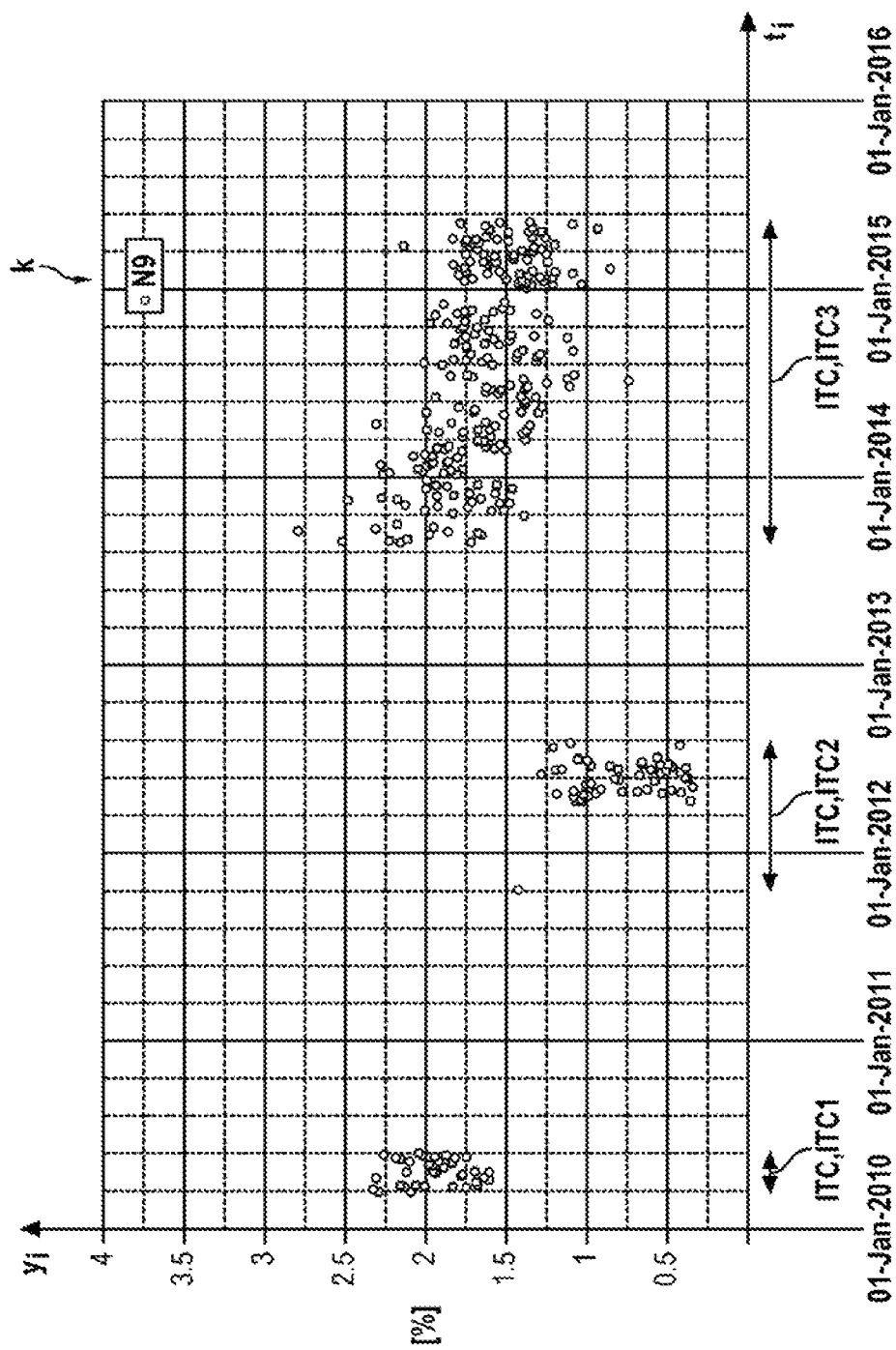
Figure 9:
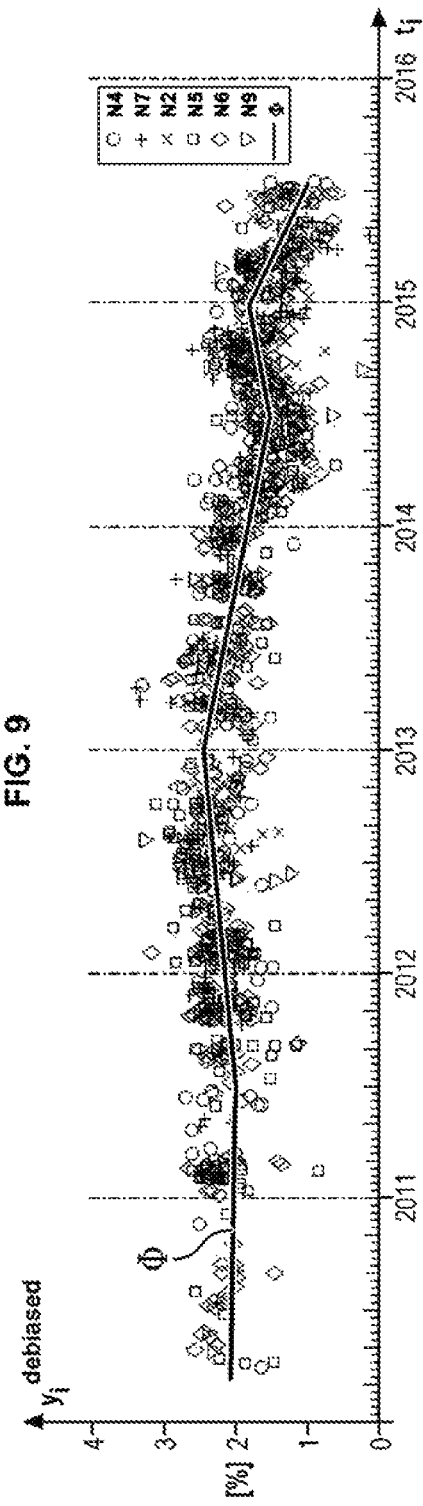
Figure 10:
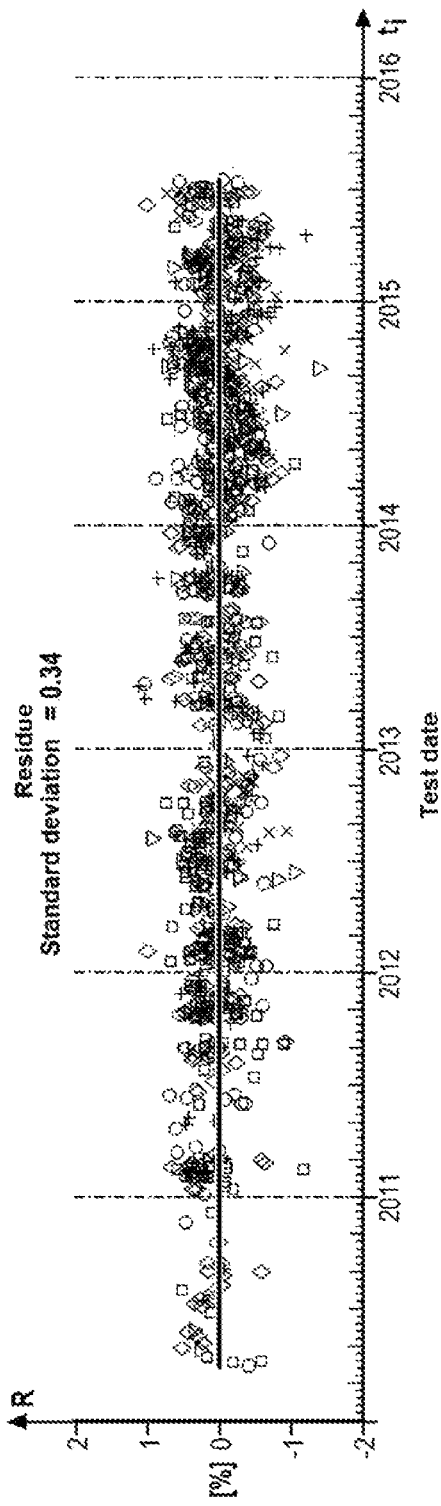
Figure 11:
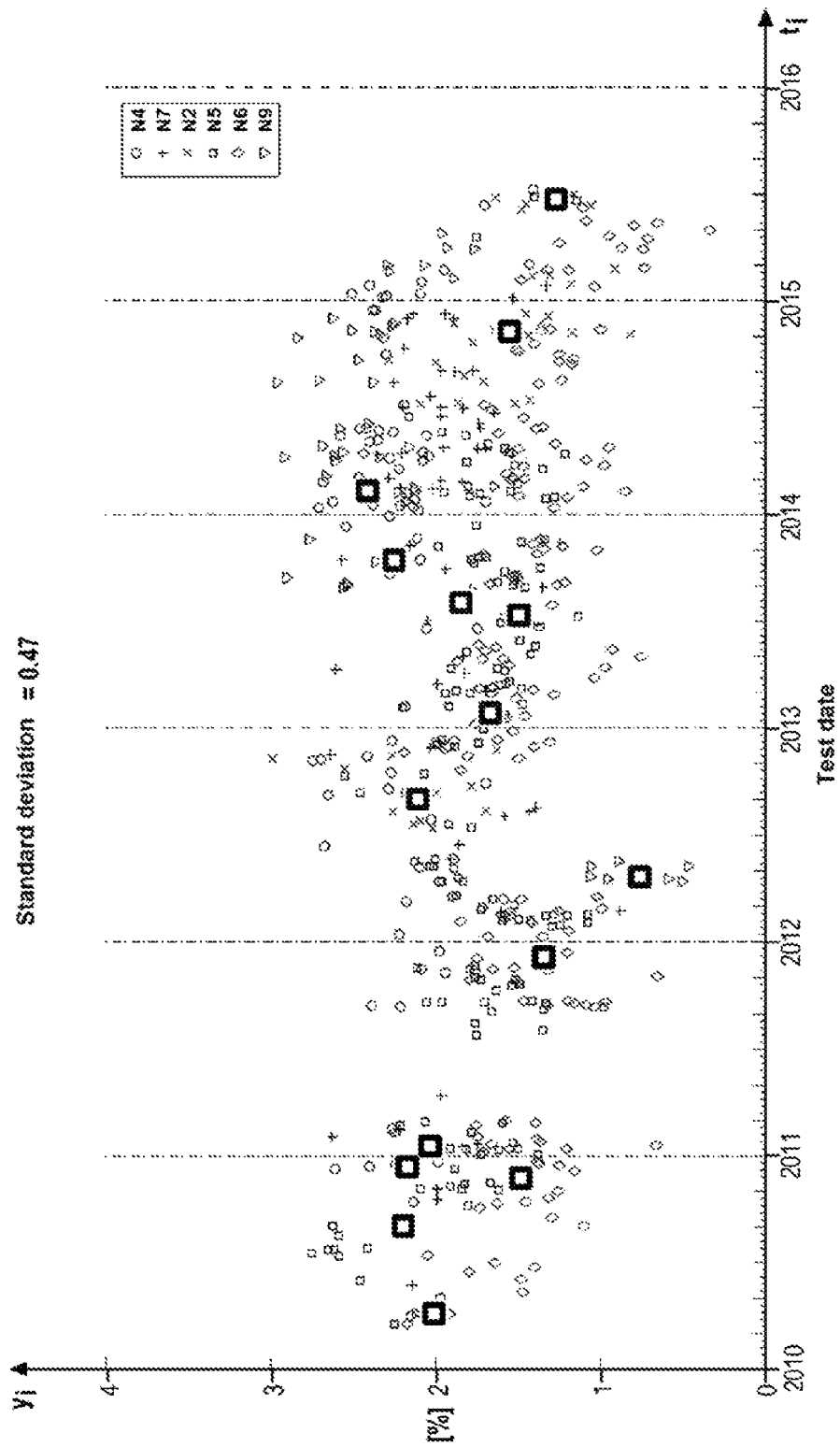
Figure 12:
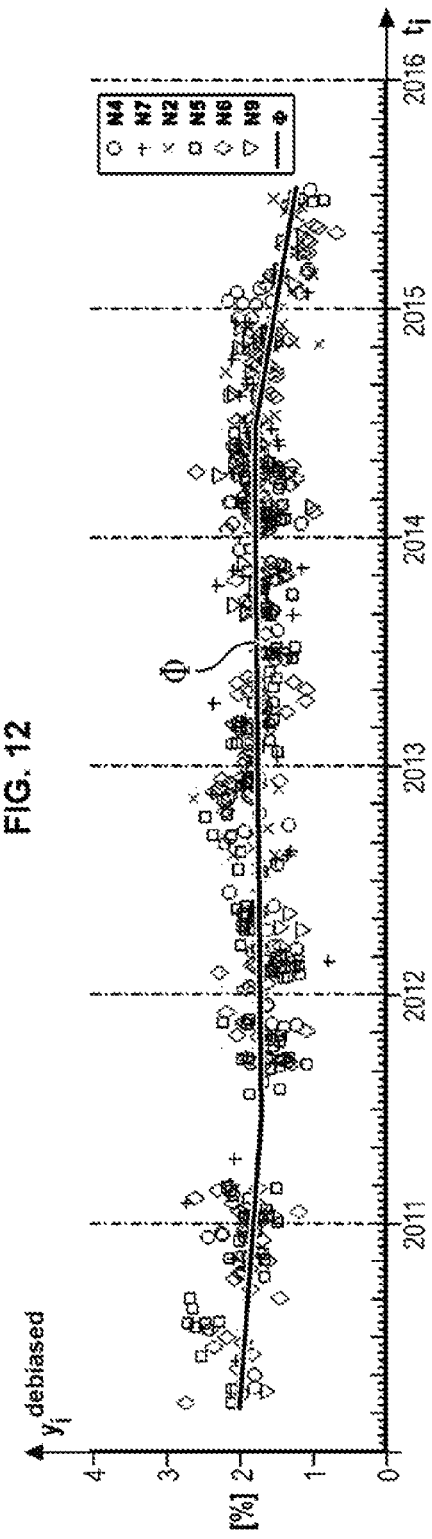

The invention will be better understood from the following description given solely by way of nonlimiting example in reference to the appended drawings, in which:

FIGS. 1, 8 and 11 illustrate measurements of thrust margins as a function of time, FIG. 2 illustrates a change in slope of a linear function modelling the thrust margin as a function of time, according to an embodiment of the measuring method and device according to the invention, FIG. 3 illustrates time intervals which can be used to define the linear function modelling the thrust margin as a function of time according to an embodiment of the measuring method and device according to the invention, FIG. 4 illustrates average points which can be used to the linear function modelling the thrust margin as a function of time according to an embodiment of the measuring method and device according to the invention, FIG. 5 is a modular synoptic of an embodiment of the measuring method and device according to the invention, FIGS. 6, 9 and 12 illustrate the unbiased thrust margin as a function of the measuring instant in the case respectively of the measurements of FIGS. 1, 8 and 11, FIGS. 7, 10 and 13 illustrate a residue of the unbiased thrust margin relative to its linear function model as a function of the measuring instant in the case respectively of the measurements of FIGS. 1, 8 and 11.

In FIG. 5, the turbomachine TUR is mounted on the measuring bench BM for measuring thrust exerted by the turbomachine TUR (which can be an aircraft turbo-reactor or an aircraft turbojet engine an aircraft turboprop or other) in test conditions. The measuring bench BM comprises one or more bench equipments k and measurement data-acquisition means (which can comprise one or more measuring instruments, one or more measuring sensors or others), for measuring one or more parameters of the turbomachine TUR, whereof the thrust PST procured by the turbomachine TUR during its operation on the measuring bench BM (for example by one or more thrust sensors measuring the thrust exerted by the turbomachine TUR during its operation). Hereinbelow, the components and equipments of the measuring bench BM are designated by the letter k. The measuring bench BM can comprise for example as equipment k a secondary cowl and/or other. The turbomachine TUR comprises rotary fans mounted on a rotor of the latter. These rotary fans can come from different providers.

The measuring device performs the steps described hereinbelow of the measuring method according to the invention.

During a measuring step, the thrust margin of the turbomachine TUR is acquired on the measuring bench BM. The measuring bench BM comprises means to acquire data comprising the thrust margin y, $y_1$ of the turbomachine TUR. For example, for this to occur, measuring data are acquired, comprising a measured thrust PST of the turbomachine TUR, by the acquisition means of the measuring bench BM. For each test, the thrust PST is measured in the conditions of the day $t_i$ of the test. According to an embodiment, the thrust PST of the turbomachine TUR, measured by the measuring bench BM, can have been further corrected to be put under standard conditions, for example according to a procedure CFM, and being called standard thrust PST.

Then the thrust margin y is calculated as a function of a specified thrust PSP and of the measured thrust PST or standard thrust PST. This calculation is performed by calculation means, such as for example the automatic calculation unit UC described hereinbelow. The specified thrust PSP is imposed for example according to a specification.

The thrust margin y (or receiving thrust margin y) is formulated to measure the difference of the measured thrust PST or standard thrust PST relative to the specified thrust PSP.

The thrust margin y (or $y_i$ hereinbelow) can be for example calculated as follows $$y = \frac{PST - PSP}{PSP}$$

The invention utilizes an average time model MOD of the thrust margin $y_i$, this model MOD being linear or affine per time intervals $INT_I$. Each time interval $INT_I$ can cover a duration of several days. The thrust margin $y_i$ is given in several measuring instants or measuring days, designated by $t_i$.

By way of example, FIGS. 1 and 4 illustrate the thrust margin $y_i$ in ordinates as a function of the measuring instant $t_i$ or measuring day $t_i$, for several equipments k of the measuring bench BM, such as for example the secondary nacelle (cowl) N4, N7, N2, N5, N6, N9 of the bench BM for a first provider of rotary fans of the turbomachine TUR.

By way of example, FIG. 8 illustrates the thrust margin $y_i$ in ordinates as a function of the measuring instant $t_i$ or measuring day $t_i$, for several bench equipments k, such as for example the secondary nacelle (cowl) N4, N7, N2, N5, N6, N9 of the bench BM for a second provider of rotary fans of the turbomachine TUR.

By way of example, FIG. 12 illustrates the thrust margin $y_i$ in ordinates as a function of the measuring instant $t_i$ or measuring day $t_h$ for several bench equipments k, such as for example the secondary nacelle (cowl) N4, N7, N2, N5, N6, N9 of the bench BM for a third provider of rotary fans of the turbomachine TUR.

A time evolution of the thrust margin y or $y_i$ is modelled by at least one linear or affine function $\phi$ or $\varphi_j(t_i)$, which is calculated for at least one determined time interval $INT_I$ of the thrust margin y or $y_i$.

At least one bias $b_k$ of the bench equipment k is calculated relative to the at least one linear or affine function $\phi$ or $\varphi_j(t_i)$ having been calculated.

The thrust margin y or $y_i$ is corrected by subtracting from this thrust margin y or $y_i$ the at least one bias $b_k$ of the bench equipment k in the at least one determined time interval $INT_I$.

For given production, a model MOD is applied according to which there is a linear or affine function $\phi$, $\varphi_j(t_i)$ of the thrust margin $y_i$ depending on the time $t_i$ between the instants corresponding to an identified time interval INT) of a component k of the bench BM. There can be several components k of the bench BM, which can be or comprise for example the bench BM and the nacelle.

Each input or measurement is defined by a triplet (y, t, k), where y is the thrust margin, having been measured as described hereinabove, t is the test date, and k is the component of the bench BM used between two maintenance events.

According to an embodiment of the invention, a binary function $\delta_k(i)$ is constructed for each component k of the bench BM, this function $\delta_k(i)$ being equal to 1 if the observation is made on the component k of the bench BM and being equal to 0 if not. This binary function $\delta_k(i)$ is therefore a binary function indicative of the component k of the bench BM.

According to an embodiment of the invention, the following model MOD is resolved $$y = \sum_k b_k \cdot \delta_k(i) + \Phi(t_i) + \varepsilon$$

where $y_i$ is the measuring margin, having been calculated from the measuring bench BM, the index i is the index of each datum observed of this measuring margin $y_i$ at an instant or day $t_i$, the number of i being finite and designating each measuring bench BM, $\phi$, $\varphi_j(t_i)$ is a linear (or affine) function per time intervals $INT_I$ on the time $t_i$, which represents the time evolution of the thrust margin $y_i$, $b_k$ is the bias introduced by the component k of the bench BM, $\varepsilon$ is the measuring error.

The function $\phi$, $\varphi_j(t_i)$ is therefore constituted by rectilinear segments as a function of time $t_i$.

According to an embodiment, the linear or affine function $\phi$, $\varphi_j(t_i)$ per time intervals $INT_I$ on $t_i$ is continuous, and it can change in slope, when passing from one time interval $INT_I$ to the following time interval $INT_I$.

There can be initial indetermination of thresholds of the thrust margin, which causes that the model MOD is positioned by an additive constant. According to an embodiment, an initial condition is taken on the average bias $\bar{b}_k$, which can be for example:

$$\bar{b}_k = \frac{1}{N} \sum_k N_k \cdot b_k$$

where $N_k$ is the number of measurements taken with the component k of the bench BM.

For example, $$N_k = \sum_i \delta_k(i)$$

This resolves this initial indetermination of the thresholds of the thrust margin.

According to an embodiment, there can be different sets of linear or affine functions $\phi$, $\varphi_j(t_i)$ per time intervals $INT_I$ on $t_i$, hereinbelow called $\phi_j$, for which the trends are specific but for which the biases $b_k$ must remain identical, such as for example in the case of different providers of components k for similar tests. The functions $\phi_j$ for each trend can be defined by keeping the bias $b_k$ and considering the indicative functions $\gamma_j(t_i)$ of sources j of data, for example indicating the provider j of components k. The indicative function $\gamma_j(t_i)$ is equal to one for the data source j or for the provider j of the component k and is equal to zero for the other sources j of data or for the other providers j of the component k. The linear or affine function $\phi$ per time intervals $INT_I$ on $t_i$ can be specific to a source of data j or provider j and can consider the indicative function $\gamma_j(t_i)$ indicating the origin of data from the data source j or from the provider j of the component k, for example according to the following equation:

$$\Phi(t_i) = \sum_j \Phi_j(t_i) \gamma_j(t_i)$$

The thrust margin $y_i$ is equal to:

$$y_i = \sum_k b_k \cdot \delta_k(i) + \sum_j \Phi_j(t_i) \gamma_j(t_i) + \varepsilon$$

This adds a new indetermination by the initial values of the functions $\phi_j$.

According to an embodiment, the linear or affine function or functions $\phi$, $\varphi_j(t_i)$ is calculated per time intervals $INT_I$ on $t_i$.

According to an embodiment, a resolution technique comprises a first resolution step, during which the evolution (linear or affine function $\phi$, $\varphi_j(t_i)$ per time intervals $INT_I$ on $t_i$) of the thrust margin $y_i$ is described, independently of the absolute level resulting from one or more components k of the bench BM.

According to an embodiment, for example during this first resolution step, each measurement $y_i$ of the thrust margin is associated with one or more first time intervals $INT_I$ where the test conditions are constant, called constant time intervals $INT_I$. There are for example L first time intervals $INT_I$ or L constant time intervals $INT_I$, for l being a whole number varying from 1 to L, where L is a natural nonzero integer number.

According to an embodiment of the invention, the at least one first time interval $INT_I$ corresponds to at least one second production time interval IPR and/or to at least one use time interval ITC of the component k on the measuring bench BM.

According to an embodiment, a second production time interval IPR or second production time intervals IPR is defined. Over each of these second production time intervals IPR the evolution (linear or affine function φ, φ$_j$(t$_i$) per time interval on t$_i$) of the thrust margin is considered different. This is illustrated by way of example in FIG. 2, showing in abscissa a production time interval IPR1, where the function φ is equal to a first linear or affine function φ$_1$, followed by a production time interval IPR2, where the function φ is equal to a second linear or affine function φ$_2$ and a change C in slope of the linear or affine function φ between the first linear or affine function φ$_1$ and the second linear or affine function φ$_2$ at the passage P12 between the interval IPR1 and the interval IPR2 (for example for N4 cited above).

According to an embodiment, a third time interval ITC of the component k of the bench BM or third time intervals ITC of the component k of the bench BM is defined as the time interval or the time intervals where the component k is present on the bench BM and has been utilized for taking measurements y$_i$. The example of FIG. 3 illustrates the example of definition of third time intervals ITC1, ITC2, ITC3 of a component k being one of the nacelles, specifically the nacelle N9 cited above.

According to an embodiment, the first time interval INT$_I$ or constant time interval INT$_I$ is defined as being the intersection between a second time production interval IPR and a third time interval ITC of the component k.

According to an embodiment, the linear or affine function φ, φ$_j$(t$_i$) is calculated in approaching a prescribed point pt or passing through a prescribed point pt. The prescribed point pt is calculated on the determined first time interval INT$_I$ or constant time interval INT$_I$, as a function of the thrust margin y or y$_i$ present on the interval. The prescribed point pt has a determined time value t$_{ptMoy}$ (according to the axis of times t in abscissa in FIGS. 1 to 4) in the first time interval INT$_I$ or constant time interval INT$_I$ and a thrust margin value pt$_{Moy}$ (according to the axis of ordinates y$_i$ in FIGS. 1 to 4).

An example of several average points pt is illustrated in FIG. 4 in the case of different nacelles N4, N7, N2, N5, N6 and N9 of FIG. 1.

According to an embodiment, the prescribed point pt is calculated as being an average point of the thrust margin y or y$_i$, whereof the determined time value t$_{ptMoy}$ is located substantially in the middle of the first time interval INT$_I$ or constant time interval INT$_I$ determined.

According to an embodiment, the average point of the thrust margin y or y$_i$ is calculated as being in the middle of the thrust margin y or y$_i$ and in the middle of the first time interval INT$_I$ or constant time interval INT$_I$ determined.

Hereinbelow a first calculation step of the linear or affine function φ, φ$_j$(t$_i$) is described.

According to an embodiment, the value φ$_j$(t$_{ptMoy}$) of the linear or affine function φ, φ$_j$(t$_i$) is calculated at the determined time value t$_{ptMoy}$ of the prescribed point pt.

According to an embodiment, the linear or affine function φ, φ$_j$(t$_i$) is calculated as minimizing, on the first time interval INT$_I$ or constant time interval INT$_I$ determined, the difference between the thrust margin y or y$_i$ and this linear or affine function φ, φ$_j$(t$_i$), relatively to the difference between the thrust margin value pt$_{Moy}$ of the prescribed point pt and the value φ$_j$(t$_{ptMoy}$) of the linear or affine function φ, φ$_j$(t$_i$) taken at the determined time value t$_{ptMoy}$ of the prescribed point pt, that is, minimizing the difference (y$_i$−pt$_{Moy}$)−(φ$_j$(t$_i$)−φ$_j$(t$_{ptMoy}$)) on the first time interval INT$_I$ or determined constant time interval INT$_I$.

For this to occur, according to an embodiment the linear or affine function φ, φ$_j$(t$_i$) is calculated on the first time interval INT$_I$ or determined constant time interval INT$_I$ as minimizing the following expression:

$$E = \sum_{I,i} [(y_i - pt_{Moy}) - (\varphi_j(t_i) - \varphi_j(t_{ptMoy}))]^2 \cdot \tau_I(i)$$

where τ$_I$(i) is a binary function for each first time interval INT$_I$ or determined constant time interval INT$_I$, which is equal to one for the measurements of thrust margins y$_i$ taken during this interval INT$_I$ and 0 for the measurements of thrust margins y$_i$ taken outside this interval INT$_I$. The binary function τ$_I$(i) is therefore a binary function indicative of the first time interval INT$_I$ or determined constant time interval INT$_I$. This is how the time evolution (thrust margin measured y$_i$–average pt) is characterized, which is independent of the measuring conditions.

According to an embodiment, the linear function φ, φ$_j$(t$_i$) is calculated as minimizing the following expression on the first time interval INT$_I$ or constant time interval INT$_I$ determined:

$$E = \sum_{I,i} \gamma_j(i) \cdot \tau_I(i) \cdot [(y_i - pt_{Moy}) - (\varphi_j(t_i) - \varphi_j(t_{ptMoy}))]^2$$

According to an embodiment, the linear or affine function φ, φ$_j$(t$_i$) is calculated as being equal to $\hat{\varphi}_f$ having the following expression:

$$\hat{\varphi}_j = \text{Arg} \min_{\varphi_j} \left\{ \sum_{I,i} \gamma_j(i) \cdot \tau_I(i) \cdot [(y_i - pt_{Moy}) - (\varphi_j(t_i) - \varphi_j(t_{ptMoy}))]^2 \right\}$$

where Argmin designates the minimum argument on the linear or affine functions φj.

There can be initial indetermination of thresholds, which causes that the model MOD is positioned by an additive constant.

When the linear or affine function φ, φ$_j$(t$_i$) has been calculated during the first step, the bias or the biases b$_k$ is calculated during a second step, described hereinbelow.

According to an embodiment, the bias or the biases b$_k$ is calculated as minimizing, on the first time interval INT$_I$ or determined constant time interval INT$_I$, the thrust margin y$_i$ from which are subtracted the bias b$_k$ and the linear or affine function φ, φ$_j$(t$_i$) which is calculated at the measuring instant t$_i$ or measuring day t$_i$ corresponding to the thrust margin y$_i$, that is, minimizing the difference $$y_i - \varphi_j(t_i) - \sum_k b_k \cdot \delta_k(i)$$

on the first time interval INT$_I$ or determined constant time interval INT$_I$.

For this to occur, according to an embodiment the bias or the biases b$_k$ is calculated as minimizing the following expression on the first time interval INT$_I$ or determined constant time interval INT$_I$:

$$\sum_i \left[ y_i - \varphi_j(t_i) - \sum_k b_k \cdot \delta_k(i) \right]^2$$

According to an embodiment, the function $\gamma_j(t_i)$ indicative of the origin of data from the data source j or from the provider j of the component k is considered, and the bias or the biases $b_k$ is calculated as minimizing the following expression, on the first time interval $INT_I$ or determined constant time interval $INT_I$:

$$\sum_{i,j} \gamma_j(i) \cdot \left[ y_i - \varphi_j(t_i) - \sum_k b_k \cdot \delta_k(i) \right]^2$$

According to an embodiment, the bias or the biases $b_k$ is calculated as being equal to $\hat{b}_k$ having the following expression:

$$\hat{b}_k = \underset{b_k}{\text{Arg min}} \left\{ \sum_{i,j} \gamma_j(i) \cdot \left[ y_i - \varphi_j(t_i) - \sum_k b_k \cdot \delta_k(i) \right]^2 \right\}$$

where Argmin designates the minimum argument on the bias or the biases $b_k$.

After the second step, the thrust margin $y_i$ is corrected to calculate the unbiased thrust margin $y_i^{debiased}$ which is equal to the thrust margin $y_i$ from which the bias or the biases $b_k$ valid in the time interval or time intervals $INT_I$ or an average of biases $b_k$ in the time interval or time intervals $INT_I$ was subtracted.

According to an embodiment, the unbiased thrust margin $y_i^{debiased}$ is calculated as being equal to $$y_i^{debiased} = y_i - \sum_k \overline{b}_k$$

where $\overline{b}_k$ is the average bias of the component k of the bench BM. According to an embodiment, the average biases $\overline{b}_k$ introduced by the components k of the bench BM are identified and optionally, in the case of the presence of several providers j, the differences between the providers j (or manufacturers j). The identification of the average bias $\overline{b}_k$ is relative to a reference for which its associated bias is supposed as zero.

According to an embodiment, the corrected thrust margin, that is the unbiased thrust margin $y_i^{debiased}$ is calculated, as being equal to $$y_i^{debiased} = y_i - \sum_k \hat{b}_k \cdot \delta_k(i)$$

In FIG. 5, the measuring device 1 according to the invention inputs a set of tests and debiases the thrust margin $y_i$ and makes it independent of the components k of the bench BM.

Described hereinbelow in reference to FIG. 5 is use of a measuring device 1 according to the invention, during which the thrust margin $y_i$ is measured and corrected, according to an embodiment of the invention. This device 1 inputs a set of tests and unbiases the thrust margin $y_i$ and makes it independent of the components k of the bench BM.

According to an embodiment of the invention, the operator OP retrieves the measuring data corresponding to the most recent production periods. These data have been automatically archived in a database BDD.

According to an embodiment of the invention, a man-machine interface IHM (viewing screen or other) proposes an interface for viewing the thrust measurements for extracting the engines whereof the fans come from a given provider and which are measured by a specific bench BM. This interface IHM for example superposes such displays by using different colours per provider and by bench BM/nacelle, for example according to FIGS. 6 to 13.

According to an embodiment of the invention, the operator utilizes the interface IHM for identifying the time intervals $INT_I$ during which the bench equipments are constant and stores them in the database BDD. For this it uses for example logbooks for maintenance and viewing of curves of time evolution of thrust measurements. The instants delimiting the time intervals $INT_I$ are for example selected by mouse clicks and are stored automatically. Once the instants of maintenance of benches are stored, the interface IHM shows them on the curves.

According to an embodiment of the invention, for each provider k the operator OP defines initial instants of change in trend, that is, the passages P12 between production time intervals IPR1 and IPR2, for example by manual initialisation. For this it uses for example logbooks for maintenance and viewing of curves of time evolution of thrust measurements. The interface IHM for example views these initial instants of change in trend P12, for example by slightly different viewing (for example of vertical continuous lines instead of dotted lines for changes in configuration).

According to an embodiment of the invention, an automatic calculation unit UC, such as for example one or more calculators and/or one or more computers and/or one or more processors and/or one or more servers and/or one or more machines, which can be programmed in advance by a preregistered software, executes automatic modelling by the linear or affine model MOD per time intervals of the thrust margin $y_i$ for a sample ECH of a certain number n, the automatic correction of the thrust margin $y_i$ and the steps of the measuring method described hereinabove. This automatic calculation unit UC supplies the corrected thrust margin $y_i^{debiased}$.

According to an embodiment of the invention, this corrected thrust margin $y_i^{debiased}$ is stored in the database BDD or in another memory, for example in association with the instants or days ti when the thrust measurement was taken. For example, the automatic calculation unit UC calculates the production trends of providers k and identifies the biases $b_k$ of the benches/nacelles as described hereinabove. The corrected thrust margin $y_i^{debiased}$ and/or the calculated biases $b_k$ are for example stored in the database BDD or in another memory, for example in association with the instants or days $t_i$ when the thrust measurement was taken, and/or are for example displayed and/or communicated on the interface IHM and/or sent to the exterior on at least one output port. A transmission device can be provided for sending these biases $b_k$ to the operators OP of benches who can correct their measurements.

Iterations of the steps described hereinabove can be made by optimizing the position and number of instants of change in trend.

Calculation of the biases corresponds to optimisation of the likelihood of the linear or affine model MOD by pieces. It is therefore possible to automatically select the instants P12 of change in production trend by optimisation methods.

According to an embodiment of the invention, according to a first possible approach of choice of instants P12 of change in production trend, a local approach consists of locally modifying these initial instants of change in trend P12 by a gradient descent from a definition for each provider k of the initial instants of change in trend P12 such as described hereinabove. This does not change the number of points P12 of change in trend, but optimizes the model MOD of slopes.

According to an embodiment of the invention, according to a second possible approach of choice of instants P12 in change in production trend, an overall approach via stochastic optimisation is used. This method consists of randomly drawing a population of selection of instants P12 (a list of lists of instants P12) and calculating the quality of models produced. The best models of instants P12 are kept and a new population of instants P12 to be tested is generated automatically from the latter by local mutation (a few steps of gradient descent or random local variations of positions P12 with decreasing variance) and by combination of lists (intersection). After a few iterations, the surviving lists correspond to the best models. This gives a mechanism of "genetic" type for identifying the best instants P12 of change in trend as well as their number.

FIG. 6 illustrates the unbiased thrust margin $y_i^{debiased}$ as a function of the measuring instant $t_i$ or measuring day $t_i$ for several bench equipments k, such as for example the secondary nacelle (cowl) N4, N7, N2, N5, N6, N9 for the first provider of rotary fans of the turbomachine TUR, from the thrust margin $y_i$ of FIGS. 1 and 4. FIG. 7 illustrates the residue R of the unbiased thrust margin $y_i^{debiased}$ of FIG. 6 relative to its model MOD of linear or affine function φ per time intervals, which has a standard deviation of 0.29, whereas the standard deviation of thrust margins $y_i$ of FIGS. 1 and 4 is 0.49.

FIG. 9 illustrates the unbiased thrust margin $y_i^{debiased}$ as a function of the measuring instant $t_i$ or measuring day $t_i$ for several bench equipments k, such as for example the secondary nacelle (cowl) N4, N7, N2, N5, N6, N9 for the second provider, from the thrust margin $y_i$ of FIG. 8. FIG. 10 illustrates the residue R of each unbiased thrust margin $y_i^{debiased}$ of FIG. 8 relative to its model MOD of linear or affine function φ per time intervals, which has a standard deviation of 0.29, whereas the standard deviation of thrust margins $y_i$ of FIG. 8 is 0.54.

Figure 13:
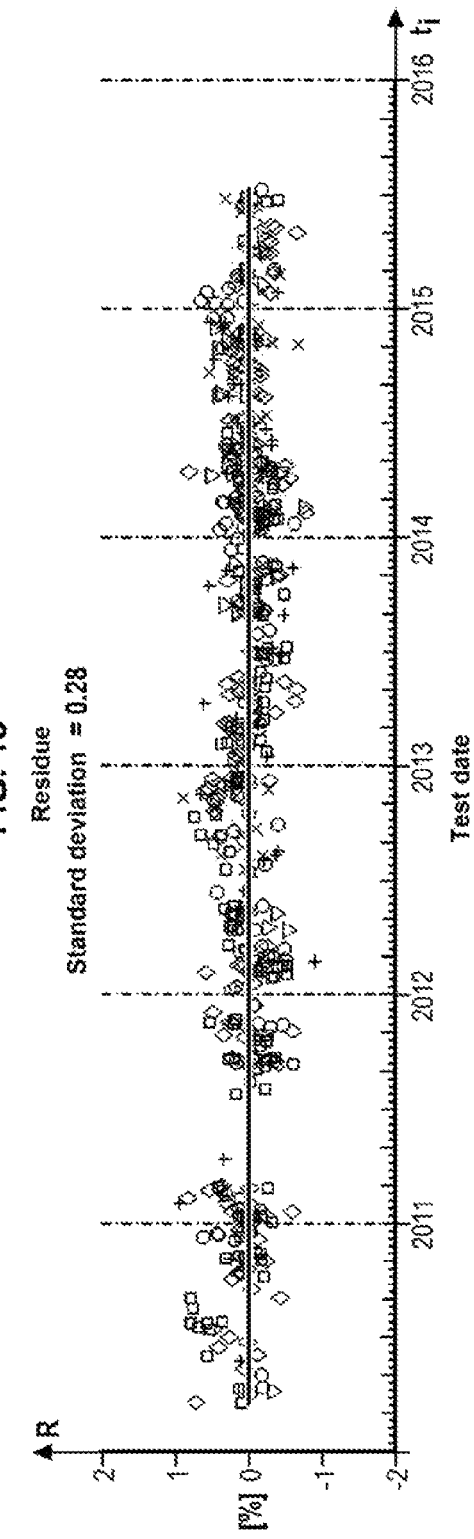

FIG. 12 illustrates the unbiased thrust margin $y_i^{debiased}$ as a function of the measuring instant $t_i$ or measuring day $t_i$, for several bench equipments k, such as for example the secondary nacelle (cowl) N4, N7, N2, N5, N6, N9 for the third provider, from the thrust margin $y_i$ of FIG. 11. FIG. 13 illustrates the residue R of each unbiased thrust margin $y_i^{debiased}$ of FIG. 12 relative to its model MOD of linear or affine function φ per time intervals, which has a standard deviation of 0.28, whereas the standard deviation of thrust margins $y_i$ of FIG. 11 is 0.47.

As shown in these FIGS. 6, 7, 9, 10, 12 and 13 by comparison to FIGS. 1, 8 and 11, the method and the device according to the invention have reduced the standard deviation and therefore dispersion of the thrust margin $y_i$ by around more than 40%.

The invention ensures the independence of the processing of the evolution of the thrust margin and quantification of biases of bench components. Also, the invention determines the evolution of the thrust margin associated with fans made by different providers and quantifies the biases introduced by the bench components without interaction between these 2 processing events. The invention almost certainly attributes a thrust result diverging relative to the specification of the engine either to a deviation of the manufactured fans or to a particular feature of the test system. The invention controls calibration of the benches BM and their accessories k precisely and continuously based on operational measures. The invention also characterizes trends in quality of fans provided by different manufacturers. The invention makes thrust measurements more robust relative to evolutions of test conditions. The invention enables better control of production by reducing uncertainty on the thrust measurement.

Of course, the embodiments, features and examples hereinabove can be combined with each other or be selected independently of each other.

The invention claimed is:

1. A method for measuring a thrust margin of a turbomachine, comprising
    measuring a thrust of the turbomachine by a measuring bench, which comprises at least one bench equipment and on which the turbomachine is,
    determining by at least one calculator data comprising the thrust margin as a function of a specified thrust and of the thrust having been measured,
    modelling by the at least one calculator a time evolution of the thrust margin by at least one linear or affine function, which is calculated by the at least one calculator for at least one determined time interval of the thrust margin,
    calculating by the at least one calculator at least one bias of the bench equipment relative to the at least one linear or affine function having been calculated,
    correcting by the at least one calculator the thrust margin by subtracting from it the at least one bias of the bench equipment in at least one determined time interval.

2. The measuring method according to claim 1, comprising
    calculating by the at least one calculator a prescribed point as a function of the thrust margin on the at least one determined time interval,
    calculating by the at least one calculator the linear or affine function in approaching a prescribed point or passing through the prescribed point.

3. The measuring method according to claim 2, comprising calculating by the at least one calculator the prescribed point as being an average point of the thrust margin and in the middle of the at least one determined time interval.

4. The measuring method according to claim 3, comprising calculating by the at least one calculator the average point of the thrust margin as being in the middle of the thrust margin and in the middle of the at least one determined time interval.

5. The measuring method according to claim 2, wherein the prescribed point has a determined time value in the at least one determined time interval and a thrust margin value, the method comprising
    calculating by the at least one calculator the linear or affine function as minimizing, on the at least one determined time interval, the difference between the thrust margin and the linear or affine function, relative to the difference between the thrust margin value of the prescribed point and the value of the linear or affine function taken at the determined time value of the prescribed point.

6. The measuring method according claim 2, comprising calculating by the at least one calculator the linear or affine function $\varphi_j(t_i)$ as minimizing, on the at least one determined time interval, the following expression:

$$E = \sum_{l,i} [(y_i - pt_{Moy}) - (\varphi_j(t_i) - \varphi_j(t_{ptMoy}))]^2 \cdot \tau_l(i)$$

where $y_i$ is the thrust margin, $\tau_l(i)$ is a binary function indicative of each at least one determined time interval, $t_{ptMoy}$ is the determined time value of the prescribed point in the at least one determined time interval, $pt_{Moy}$ is the thrust margin value of the prescribed point in the at least one determined time interval.

7. The measuring method according to claim 1, comprising calculating by the at least one calculator the at least one bias as minimizing, on the at least one determined time interval, the thrust margin from which the at least one bias and the linear or affine function are subtracted, which is calculated at a measuring instant or measuring day corresponding to the thrust margin.

8. The measuring method according to claim 1, comprising calculating by the at least one calculator the at least one bias as minimizing, on the at least one determined time interval, the following expression:

$$\sum_i \left[ y_i - \varphi_j(t_i) - \sum_k b_k \cdot \delta_k(i) \right]^2$$

where $y_i$ is the thrust margin, $\delta_k(i)$ is a binary function indicative of the at least one bench equipment k of the measuring bench, $\varphi_j(t_i)$ is the linear or affine function.

9. The measuring method according to claim 1, comprising calculating by the at least one calculator the at least one bias $b_k$ as minimizing, on the at least one determined time interval, the following expression:

$$\sum_{i,j} \gamma_j(i) \cdot \left[ y_i - \varphi_j(t_i) - \sum_k b_k \cdot \delta_k(i) \right]^2$$

where $y_i$ is the thrust margin, $\delta_k(i)$ is a binary function indicative of the at least one bench equipment k, $\varphi_j(t_i)$ is the linear or affine function, $y_j(t_i)$ is a function indicative of an origin of data from a data source j or from a provider j of the at least one bench equipment k.

10. The measuring method according to claim 1, wherein the at least one determined time interval corresponds to at least one production time interval and/or to at least one time interval, during which the at least one bench equipment is present on the measuring bench, and/or to an intersection between at least one production time interval and the at least one determined time interval, during which the at least one bench equipment is present on the measuring bench.

11. A device for measuring a thrust margin of a turbomachine, the device comprising
a measuring bench for measuring a thrust of the turbomachine,
the measuring bench comprising at least one bench equipment,
at least one calculator to determine data comprising the thrust margin as a function of a specified thrust and of the thrust having been measured,
model a time evolution of the thrust margin by at least one linear or affine function, which is calculated for at least one determined time interval of the thrust margin,
calculate at least one bias of the bench equipment relative to the at least one linear or affine function having been calculated,
correct the thrust margin by subtracting from it the at least one bias of the bench equipment in the at least one determined time interval.

\* \* \* \* \*